UNITED STATES PATENT OFFICE.

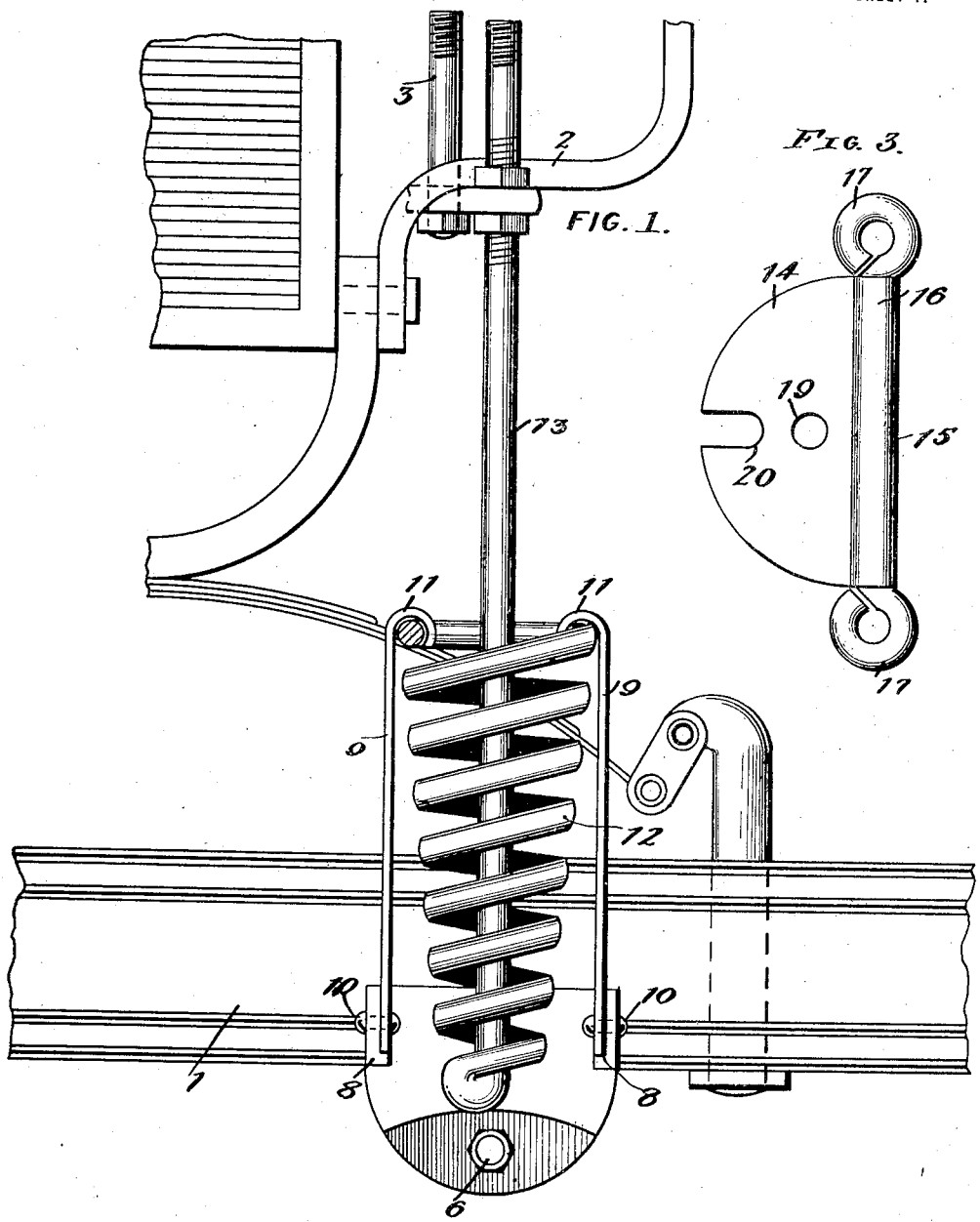

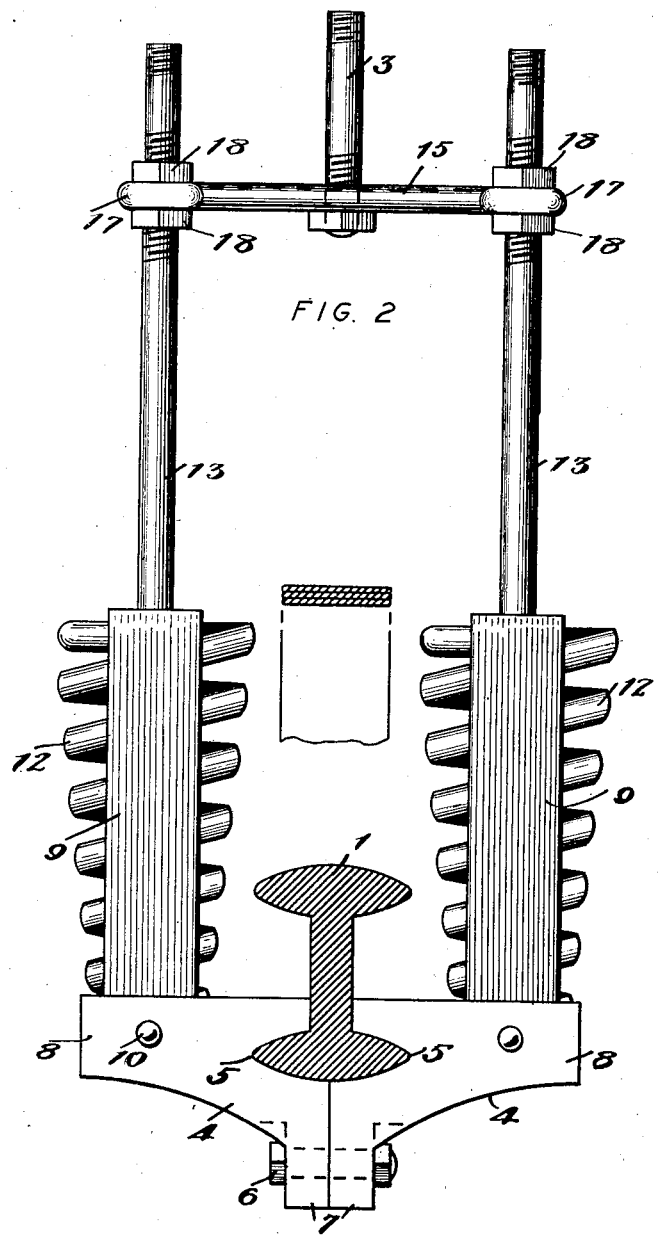

JOHN SIMEON HOWK, OF KANSAS CITY, MISSOURI.

SPRING-CONTROLLER.

1,355,555.    Specification of Letters Patent.    Patented Oct. 12, 1920.

Application filed October 22, 1919. Serial No. 332,388.

*To all whom it may concern:*

Be it known that I, JOHN SIMEON HOWK, a citizen of the United States, and a resident of Kansas City, in the county of Jackson and State of Missouri, have invented certain new and useful Improvements in Spring-Controllers, of which the following is a specification.

My invention is an improvement in spring controllers, and has for its object to provide a simple and inexpensive device of the character specified for neutralizing the rebound of the spring, wherein the controller is arranged to assist in cushioning the downward movement of the body of the vehicle and to hold the same on the rebound, and which may be attached to the vehicle at either or both ends, and wherein the side swaying or rocking of the vehicle is not interfered with.

A further object of the invention is to provide a device in which the auxiliary spring may be adjusted to remain inactive under normal load, to permit the usual springs of the vehicle to act, and wherein the spring is arranged to increase in strength under compression.

In the drawings:

Figure 1 is a partial front view of a vehicle provided with the improved controller;

Fig. 2 is a view partly in section at right angles to Fig. 1;

Fig. 3 is a plan view of the swivel plate.

The present embodiment of the invention is shown in connection with a motor vehicle of ordinary type, being arranged between the axle 1, in the present instance the front axle, and the mud guard brace 2 which carries the lamp supporting bracket 3. A clamp is connected to the axle 1, the said clamp consisting of similar sections 4, which are recessed on their abutting faces, as shown at 5, to receive the lower cross member of the H-shaped axle.

The sections are clamped upon the axle by means of a bolt and nut 6 which passes through depending lugs 7 on the lower faces of the sections. Each section has a pair of outwardly extending ears 8, and to each ear of each pair there is connected a plate 9, by means of a rivet 10 or the like, the plates being on the inner sides of the ears, which are rabbeted to receive the plates, as shown in Fig. 1. Each of these plates is provided at its upper end with a hook 11.

Between each pair of plates is arranged a coil spring 12 and each of these springs, as will be seen by referring to Fig. 2, is composed of coils which gradually decrease in diameter from above downward, so that the spring as a whole has a conical form. The hooks engage over the uppermost coil, which is largest.

A rod 13 is integral with each spring at the small end thereof, and each of these rods is connected at its upper end to the brace 2 in a manner to be presently described. Referring to Figs. 1 and 2, it will be seen that a pair of springs is provided for each side of the vehicle, that is, for each end of each axle, one member of the pair being in front of the axle and the other behind and the rods 13 of the two springs are connected with a swivel plate 14 which in turn is connected to the lamp post 3.

The swivel plate 14 is a substantially semi-circular plate having at its straight edge a bearing 15 for receiving a rod 16 which is provided at each end with an eye 17. The upper ends of the rods 13 are threaded, and are passed through these eyes 17, lock nuts 18 being threaded on to the rods above and below the eyes. By means of the lock nuts the swivel plate as a whole may be adjusted to the clamp 4—4. The swivel plate has an opening 19 at approximately its center, through which the lamp post 3 passes, and at the center of its curved edge the plate has a notch or recess 20 for engagement by the brace 2. Movement of the body toward the axle will cause the spring to expand, and the strength of the spring decreases with expansion. On the contrary, when the body moves upward, the spring contracts and the strength increases with contraction. Hence rebound is cushioned in accordance with the strength of the rebound.

Because of the swivel connection between the swivel plate 14 and the body of the vehicle lateral rocking of the vehicle is not interfered with.

In applying the spring controller to a vehicle, the spring is compressed or adjusted to the desired pressure. For example, in a vehicle intended to carry normally five hundred pounds the swivel plate is adjusted to the distance that the body would drop under the weight of five hundred pounds. With this arrangement the least jar, either upward or downward, is caught by the spring controller.

I claim:

1. A device of the character specified comprising in combination with the axle and the body a pair of coil springs, the members of the pair being arranged on opposite sides of the axle, a rod extending from the lower end of the spring upwardly through the spring and connected with the body, a clamp connected with the axle and having hooks for engaging the uppermost coils of the springs, said connection between the body and the rods being adjustable with respect to the rods, and being hinged to the body to prevent interference with the rocking movement of the body.

2. A device of the character specified comprising a pair of coil springs adapted to be arranged on opposite sides of the axle of a vehicle, a rod extending from the lower end of each spring upwardly through the spring, a clamp for engaging the axle provided with hooks for engaging the uppermost coils of the springs, and means for hingedly connecting the upper ends of the rods to the body.

JOHN SIMEON HOWK.